United States Patent [19]

Le et al.

[11] Patent Number: 4,661,540

[45] Date of Patent: Apr. 28, 1987

[54] WATER REDUCIBLE COATING COMPOSITIONS

[75] Inventors: Minh V. Le; Brian S. Hawkett; William T. Elliott, all of New South Wales, Australia

[73] Assignee: Berger, Jenson & Nicholson Limited, London, England

[21] Appl. No.: 805,383

[22] Filed: Dec. 4, 1985

[30] Foreign Application Priority Data

Dec. 6, 1984 [AU] Australia .............................. PG8445
Jul. 25, 1985 [AU] Australia ............................ PH01642

[51] Int. Cl.$^4$ ............................................. C08L 33/02
[52] U.S. Cl. ..................................... 523/409; 523/412
[58] Field of Search ........................ 523/408, 409, 412

[56] References Cited

U.S. PATENT DOCUMENTS

| | | | |
|---|---|---|---|
| 4,383,059 | 5/1983 | Brook | 523/412 |
| 4,458,040 | 7/1984 | Suzuki | 523/409 |

*Primary Examiner*—Paul R. Michl
*Attorney, Agent, or Firm*—Wenderoth, Lind & Ponack

[57] ABSTRACT

An aqueous dispersion of a tertiary amine terminated polyether and a carboxylic acid functional polymer. The tertiary amine terminated polyether is the product of the reaction of the epoxy group of an epoxy resin with the hydroxy group of a hydroxy functional tertiary amine and the carboxylic acid functional polymer is present in an amount sufficient to render the combination water dispersible.

A process for producing the aqueous dispersion is also described, together with coating compositions based on the dispersion. These coating compositions are particularly useful in the lining of metal containers for food and beverages.

19 Claims, No Drawings

WATER REDUCIBLE COATING COMPOSITIONS

This invention relates to an aqueous dispersion of a tertiary amine terminated polyether and a carboxylic acid functional polymer, a process for producing the same and coating compositions based on the aqueous dispersion of polymer. The coating compositions of this invention are inter alia useful for lining metal containers for food, beer and other beverages.

Epoxy resins are generally regarded as providing an excellent combination of properties; offering good adhesion, flexibility and resistance to solvent and chemical attack.

There is an increasing demand, worldwide, for low V.O.C. water reducible coating compositions to replace solvent based systems. [V.O.C. is the weight of organic solvent per unit volume of solid coating, expressed in grams per liter]. Epoxy resins are hydrophobic in nature. Consequently, many attempts have been made to modify epoxy resins to make them water dispersible without loss of their desirable properties. These approaches have met with varying degrees of success.

For example, EP No. 6334, EP No. 116225 and related patents teach the grafting of an epoxy resin to a hydrophilic acrylic polymer containing carboxyl groups, by reaction between the epoxide groups of the epoxy resin and the carboxylic acid groups of the acrylic polymer. Thus the bonds linking the hydrophilic and hydrophobic components of the copolymer are ester bonds. This approach has the disadvantage that, in a water based coating composition, the ester bonds tend to hydrolyse, resulting in poor storage stability.

British Pat. Nos. 1,585,486 and 1,585,487 teach the approach of growing a hydrophilic acrylic polymer containing carboxyl groups by free radical addition polymerisation, in the presence of a modified epoxy resin. The key to this approach is the use of relatively high levels of a free radical initiator which has high hydrogen abstraction power (principally benzoyl peroxide); this leads to the grafting of the acrylic polymer to the epoxy resin by chain transfer. This approach has the disadvantage that the level of grafting is relatively low. Furthermore, the water based coating composition made by this approach has a relatively high viscosity for a given solids.

Yet a different approach is taught by U.S. Pat. No. 4,247,439, WO No. 83/03613 and related patents. These patents teach the reaction of the residual epoxide groups of an epoxy resin with a tertiary amine, in the presence of water, to form a quaternary amine hydroxide terminated polyether. The product of this reaction is dispersed in water by incorporating a blend of carboxylic acid functional polymers. This approach has the great disadvantage that it is cumbersome, and hence expensive, in that there are a relatively large number of intermediate products that go to make up the final product.

According to the present invention there is provided an aqueous dispersion of a tertiary amine terminated polyether and a carboxylic acid functional polymer wherein the tertiary amine terminated polyether is the product of the reaction of the epoxy group of an epoxy resin with the hydroxy group of a hydroxy functional tertiary amine and the carboxylic acid functional polymer is present in an amount sufficient to render the combination water dispersible.

The invention also provides a process for producing this aqueous dispersion which comprises:
(a) reacting the epoxide groups of an epoxy resin with a hydroxy functional tertiary amine to form a tertiary amine terminated polyether, and
(b) dispersing the tertiary amine terminated polyether in water with the aid of a carboxylic acid functional polymer in an amount sufficient to render the combination dispersible.

There is further provided a coating composition comprising a stable dispersion in water of:
(i) a tertiary amine terminated polyether which is in ionic association with
(ii) a polymer derived, at least in part, from carboxylic acid functional monomers, and
(iii) a crosslinking agent.

It will be appreciated that, in practice, some unassociated polymer of type (i) and/or type (ii) may also be present in the composition.

An ionically associated polymer complex is thought to result from an acid base relationship between the amine terminated polyether and the carboxylic acid containing polymer. The amine terminated polyether is formed by reacting the 1,2 epoxide group of an epoxy resin with the hydroxy group of a hydroxy functional tertiary amine (e.g. N,N dimethyl ethanolamine). Optionally the coating may also contain zinc oxide or other pigmentation, depending on the final application.

An advantage of this product is that it allows considerable flexibility in formulating coating compositions with desired solids viscosity relationships. Typical examples would be: 45% solids at a viscosity of 26 sec. Ford No. 4 Cup at 25° C., and 17-½% solids at a viscosity of 21 sec. Ford No. 4 Cup.

In the simplest approach to making the amine terminated polyether used in the present invention, a low molecular weight epoxy resin (e.g. DER343) is reacted with Bisphenol A in a suitable organic solvent. The hydroxy functional tertiary amine is added to the resultant epoxy resin and the reaction mixture is held at ca 100° C. for about 1 hour. Examples of suitable hydroxy functional tertiary amines are N,N dimethylethanolamine (DMEA), N,N diethylethanolamine (DEEA), 2-dimethylamino-2-methyl-propanol (DMAMP) and triethanolamine.

During the course of the reaction, the tertiary amine group of the hydroxy functional amine catalyses the reaction of the hydroxy group with the residual epoxide groups of the epoxy resin, according to the reaction scheme below:

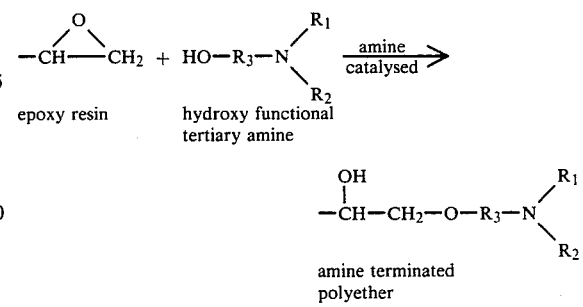

amine terminated polyether

Where, in the case of DMEA, $R_1$ and $R_2$ are methyl groups and $R_3$ is —$CH_2$—$CH_2$—. It must be borne in mind that the presence of a hydroxy functional solvent (e.g. butanol or butyl cellosolve) will reduce the yield of the tertiary amine terminating groups by competing with the hydroxyl groups of the tertiary amine. If significant amounts of water are present, the undesirable quaternary amine hydroxide will be formed. Thus preferred results are achieved when the reaction is carried out under anhydrous conditions.

In order to confirm the reaction products stated above, we carried out experiments in which, in order to facilitate analysis, we maximised the number of 1,2 epoxide groups available for reaction.

EXPERIMENT 1

REACTION OF DMEA WITH EPOXIDE GROUPS

Dry propylene oxide, 146.6 g, and dry DMEA 224.9 g (water content less than 0.05%) were mixed together in a round-bottomed flask fitted with a thermometer, a stirrer and a reflux condenser. The reaction mixture was heated to 40° C. whereupon it exothermed to 90° C. before the temperature began to fall. Excess reactants were distilled off using a rotary evaporator. Analysis of the product by NMR and GPC showed that, despite some polymerisation, the reaction product was predominantly that shown below:

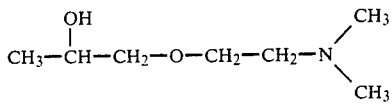

EXPERIMENT 2

REACTION OF DRY DMEA WITH THE DIGLYCIDYL ETHER OF BISPHENOL A

Dry DER331 11 g, and dry DMEA 211 g were mixed together in a 500 ml round-bottomed flask fitted with a condenser, a thermometer, a stirrer and temperature controller, heated to 105° C. and held at that temperature for 1 hour. Excess DMEA was removed from the reaction mixture using a rotary evaporator. Analysis by NMR showed that a considerable amount of the product obtained was due to the reaction of the hydroxyl group of DMEA with the epoxide group of DER331. Further evidence for the tertiary amine terminated product was that it was soluble in water only at low pH.

EXPERIMENT 3

REACTION OF DMEA WITH THE DIGLYCIDYL ETHER OF BISPHENOL A IN THE PRESENCE OF WATER

DER331 2.2 g, DMEA 10.7 g, water 208 g, and dimethyl formamide 283 g were mixed together in a round-bottomed flask fitted with a reflux condenser, a stirrer and a thermometer and heated to reflux (106° C.). The mixture was maintained at reflux for 6 hours. The product was purified using a rotary evaporator. Analysis of the product was consistent with it being quaternary amine salt. Furthermore, the product was water soluble under neutral, acidic and basic conditions.

In the product of this invention the tertiary amine terminated polyether is dispersed in water with the aid of a carboxylic acid functional polymer. The number of carboxylic acid groups in the carboxylic acid functional polymer in a given amount of product needs to be sufficient to form an effective ionic association with the amine terminated polyether and for a stable dispersion in water to be formed. If the carboxylic acid functional polymer is a copolymer of an ethylenically unsaturated acid, such as acrylic acid or methacrylic acid, and hydrophilic co-monomers such as 2 hydroxy propyl methacrylate, 2 hydroxy ethyl acrylate, or acrylamide, then the number of acid groups on the carboxylic acid functional polymer in a given amount of product may be less than the number of tertiary amine groups on the polyether in that same amount of product. If, however, the carboxylic acid functional polymer is a copolymer of an ethylenically unsaturated acid and more hydrophobic monomers such as styrene or butyl acrylate, then a larger proportion of acid groups is required than if hydrophilic co-monomers are used.

Our experience with this type of system reveals that the final viscosity of the coating composition, at a given amount of solids, is governed by:

(i) The spacing of the carboxylic acid groups in the carboxylic acid functional polymer. The more the acid groups are spaced by other monomers, at a given total number of carboxylic groups, the lower the viscosity.

(ii) The VOC; the lower the VOC, the lower the viscosity.

(iii) The degree of neutralisation of the carboxylic acid groups; the lower the degree of neutralisation, the lower the viscosity. It is always necessary, however, to ensure a suitable degree of neutralisation to provide a stable dispersion.

(iv) The ratio of carboxylic acid functional polymer to the tertiary amine terminated polyether. The higher the ratio of carboxylic acid functional polymer, the higher the viscosity.

(v) The molecular weight of the carboxylic acid functional polymer; the higher the molecular weight, the higher the viscosity.

As mentioned above, the role of the solvent can be important in determining the properties of the final coating composition. If the degree of ionic association between the polyether and the polycarboxylic acid functional polymer is too great, the polymer blend will gell and it will no longer be possible to disperse it in water. The degree of ionic association is controlled by controlling the amine value of the polyether; more specifically by minimising the number of molecules which have tertiary amine groups on both ends. This can be achieved by, in the first instance, minimising the number of modified epoxy resin molecules with 1,2 epoxide groups on each end, and in the second instance, by reacting some of these groups with hydroxy functional solvents, such as butyl cellosolve or butanol. Obviously, if the amine termination reaction is carried out in the presence of an hydroxy functional solvent, the extent of amine termination would be reduced because the tertiary amine would be expected to catalyse the reaction of the solvent hydroxyl groups with the epoxide groups of the epoxy resin.

EXAMPLE 1

CARBOXYLIC ACID FUNCTIONAL POLYMER FOR A HIGH SOLIDS COATING

| | | Wt. (g) |
|---|---|---|
| a a | Acrylic acid | 584 |
| a b | Styrene | 843 |
| a c | Benzoyl peroxide | 7.0 |
| b b | Butyl cellosolve | 1414 |
| b c | Ethyl alcohol | 1106 |

-continued

|     |                    | Wt. (g) |
| --- | ------------------ | ------- |
| c c | t-butyl perbenzoate | 5.4    |
| c d | Toluene            | 18.4    |
| d d | t-butyl perbenzoate | 5.4    |
| d e | Toluene            | 18.4    |

1. aa, ab and ac were added to a 5-liter five-necked, flange-topped round-bottomed flask fitted with a condenser, a stirrer and a thermometer, and stirred until ac had dissolved.

2. bb and bc were then added and the mixture heated to reflux temperature (ca 96° C.) and held at this temperature over 1 hour.

3. cc and cd were then premixed, added to the flask and held at reflux for 30 minutes.

4. dd and de were premixed, added to the flask and held at reflux temperature for 1 hour.

EXAMPLE 2

HIGH SOLIDS, LOW VISCOSITY COATING COMPOSITION

|     |                                              | Wt. (g) |
| --- | -------------------------------------------- | ------- |
| a a | Epikote 8290 (Product of Shell Chemical Co.) | 519     |
| a b | Bisphenol A                                  | 470     |
| a c | Butyl cellosolve                             | 285     |
| b b | DMEA                                         | 53      |
| b c | Butyl cellosolve                             | 107     |
| c c | Polyelectrolyte solution (Example 1)         | 1182    |
| d d | DMEA                                         | 70      |
| e e | Water                                        | 1888    |
| f f | Cymel 303 (Product of American Cyanamid Co.) | 427     |

1. aa, ab and ac were added to a 5-liter five-necked, flange-topped, round-bottomed flask fitted with a condenser, a stirrer and a thermometer, and mixed well. The vessel contents were heated to 170° C. over 1 hour; the heating was turned off and the exotherm was allowed to take the temperature to reflux (195°–200° C.). The reaction was allowed to proceed until a viscosity of W at 25° C. was obtained (diluted to 52% solids in butyl cellosolve), (total cook time was 1.5 hours), after which the vessel contents were cooled to 130° C. over a period of 45 minutes.

2. bb and bc were then premixed and added slowly to the flask with stirring. The vessel contents were cooled to 100° C. and held at that temperature for 1 hour. About 150 g of solvent was removed by distillation under an air stream to remove excess amine.

3. cc was then added to the vessel and mixed in well. A further 736 g of solvent was distilled off using an air stream.

4. dd was added and mixed in well.

5. ee was added and mixed in well.

6. ff was added and mixed in well for 20 minutes.

The finished coating composition had 45% solids, a VOC of 166 g/liter and a viscosity of 26 sec. Ford 4 Cup @ 25° C. A sample of this coating composition was drawn down on aluminum foil and cured for 10 minutes at 200° C. The coating exhibited excellent film properties.

EXAMPLE 3

WATER BASED CARBOXYLIC ACID FUNCTIONAL POLYMER

|     |                      | Wt. (g) |
| --- | -------------------- | ------- |
| a a | Acrylic acid         | 477     |
| a b | Acrylamide           | 115     |
| a c | Water                | 3280    |
| b b | Potassium persulphate | 6      |
| b c | Water                | 120     |

1. aa, ab and ac were added to a 5-liter five-necked, flange-topped, round-bottomed flask fitted with a condenser, a stirrer and a thermometer, and heated to reflux (100° C.). The heating was then turned off.

2. bb and bc were premixed and added to the flask over 2 hours; the heating was then turned on and the vessel contents were held at reflux for 1 hour.

EXAMPLE 4

A LOW SOLIDS AND HIGH VISCOSITY COATING COMPOSITION BASED ON CARBOXYLIC ACID FUNCTIONAL POLYMER OF EXAMPLE 3

|     |                                      | Wt. (g) |
| --- | ------------------------------------ | ------- |
| a a | Epikote 8920                         | 519     |
| a b | Bisphenol A                          | 470     |
| a c | Butyl cellosolve                     | 285     |
| b b | DMEA                                 | 53      |
| b c | Butyl cellosolve                     | 107     |
| c c | Polyelectrolyte solution (Example 3) | 1390    |
| d d | DMEA                                 | 94      |
| e e | Water                                | 615     |
| f f | Cymel 303                            | 427     |

The method of preparation was as for Example 2 except that no solvent was distilled off in Step 3.

The resulting coating composition had a viscosity of 78 sec. Ford Cup No. 4 at 25° C. when adjusted to 17% solids, with water. A sample of this coating composition was drawn down on aluminum foil and cured for 10 minutes at 200° C. The coating exhibited excellent film properties.

EXAMPLE 5

CARBOXYLIC ACID FUNCTIONAL POLYMER WITH RELATIVELY LOW CONCENTRATION OF ACID GROUPS

|     |                              | Wt. (g) |
| --- | ---------------------------- | ------- |
| a a | Methoxy propoxy propanol     | 400     |
| a b | Deionised water              | 4.4     |
| a c | Methyl Ethyl Ketone          | 45      |
| a d | Paxwax 6364LA (National Wax Co.) | 40  |
| b b | Butyl Acrylate               | 680     |
| b c | Acrylic acid                 | 65      |
| b d | Hydroxy propyl methacrylate  | 210     |
| c c | Benzoyl peroxide             | 4.5     |
| c d | Methyl ethyl ketone          | 45      |
| d d | Tertiary butyl perbenzoate   | 4       |
| d e | Butyl cellosolve             | 40      |
| d g | Water                        | 5       |
| e e | Tertiary butyl perbenzoate   | 4       |
| e f | Butyl cellosolve             | 50      |
| e g | Water                        | 5       |
| h h | N,N—dimethylethanolamine     | 40      |
| i i | Water                        | 1385    |

-continued

| | | Wt. (g) |
|---|---|---|
| j j | Butyl cellosolve | 223 |

1. aa, ab, ac and ad were added to a 5-liter five-necked, flange-topped, round-bottomed flask fitted with a condenser, a stirrer, two dropping funnels and a thermometer-temperature controller, and heated to 100° C. under a nitrogen blanket.

2. Add bb, bc and bd and cc and cd simultaneously over 2 hours while maintaining the temperature at 110° C.

3. Add dd, de, df and hold at 100° C. for 1 hour.
4. Add ee, ef and eg and hold at 100° C. for 1 hour.
5. Add hh and mix well.
6. Add ii and mix well. Distil off 1840 g of solvent at temperatures between 100° C. and 120° C.
7. Add jj and mix well.

EXAMPLE 6

COATING COMPOSITION BASED ON EXAMPLE 5

| | | Wt. (g) |
|---|---|---|
| a a | DER343 (Dow Chemical Co.) | 341 |
| a b | Bisphenol A | 293 |
| a c | Butyl cellosolve | 177 |
| b b | N,N—dimethylethanolamine | 34 |
| b c | Butyl cellosolve | 34 |
| c c | Product of Example 5 | 707 |
| d d | Water | 1600 |
| e e | Cymel 303 (Cyanamid Co.) | 120 |
| f f | Water | 207 |
| g g | 2% Phosphoric acid aqueous solution neutralized with N,N—dimethylethanolamine (pH = 7.0) | 82 |

1. aa, ab and ac were added to a 5-liter five-necked, flange-topped, round-bottomed flask fitted with a condenser, a stirrer and a thermometer-temperature controller, and mixed well. The vessel contents were heated to 170° C., the heating was turned off and the exotherm was allowed to take the temperature to reflux (195°-200° C.). Allow reaction to cool to 170° C.

2. Cool to 130° C., add bb and bc; maintaining the temperature at 105° C. for 1 hour. Distil off 34 g of solvent.
3. Add cc and mix well at 70° C. over 30 minutes.
4. Add dd slowly with good mixing. Cool to 50° C.
5. Add ee and mix well.
6. Add to adjust viscosity; mix well.
7. Add gg and mix until any precipitate redisperses.

The resulting coating composition had a viscosity of 50 sec. Ford Cup No. 4 at 25° C. at 38% solids.

EXAMPLE 7

PREPARATION OF AMINE TERMINATED POLYETHER FOR USE IN EXAMPLES 8 AND 9

| | | Wt. (g) |
|---|---|---|
| a a | DER343 | 681 |
| a b | Bisphenol A | 586 |
| a c | Butyl cellosolve | 355 |
| b b | DMEA | 67 |
| b c | Butyl cellosolve | 67 |

1. aa, ab and ac were mixed in a 2-liter flask fitted with a condenser, a thermometer-temperature controller, and a stirrer, heated to 170° C. and the heating turned off. The exotherm was allowed to take the temperature to 200° C. When the temperature decreased to 170° C., the reaction was cooled to 130° C.

2. bb and bc were premixed and added to the reaction mixture. The temperature was maintained at 105° C. for 1 hour after which 67 g of solvent was distilled off.

The following two examples demonstrate a method of preparing the carboxylic acid functional polymer in the presence of the amine terminated polyether.

EXAMPLE 8

USING LOW ACID VALUE CARBOXYLIC ACID FUNCTIONAL POLYMER

| | | Wt. (g) |
|---|---|---|
| a a | Amine terminated polyether (Example 7) | 608 |
| a b | Butanol | 500 |
| a c | Paxwax 6364LA | 20 |
| b b | Butyl acrylate | 866 |
| b c | Styrene | 158 |
| b d | Acrylic Acid | 220 |
| b e | Hydroxy propyl methacrylate | 354 |
| c c | Benzoyl peroxide | 8 |
| c e | Toluene | 80 |
| d d | Tertiary butyl perbenzoate | 2 |
| d e | Butanol | 20 |
| e e | Tertiary butyl perbenzoate | 6 |
| e f | Butanol | 20 |
| f f | Tertiary butyl perbenzoate | 6 |
| f g | Butanol | 20 |
| g g | Dimethylethanolamine | 136 |
| g h | Water | 400 |
| h h | Water | 4002 |
| i i | Cymel 303 | 212 |
| j j | Water | 4600 |

1. aa, ab and ac were mixed in a 5-liter flask fitted with a thermometer-temperature controller, a condenser, a stirrer and 2 droppers. The mixture was heated to 100° C.

2. bb, bc, bd and be; cc and ce were premixed, and slowly added into the flask over 2 hours at controlled temperature of 100° C. The temperature was maintained at 100° C. for 1 hour.

3. dd and de were premixed and added and reaction was maintained at 110° C. over 15 mins.

4. ee and ef were premixed and added, and the reaction was kept at 120° C. over 1 hour.

5. ff and fg were premixed and added, cooked at 120° C. over 6 hours and then cooled to 90° C.

Dispersion procedure:
6. gg was added with constant stirring.
7. hh was slowly added while mixing well.
8. ii was then added with stirring.
9. jj was added with stirring.

The above coating composition was diluted to 17.5% solids and was found to have a viscosity of 16 sec. Ford Cup No. 4 at 25° C. The coating was sprayed into 2-piece aluminum cans using a Nordson laboratory spray machine and exhibited excellent coverage at both ca 100 mg and ca 180 mg per can.

EXAMPLE 9

USING HIGH ACID VALUE CARBOXYLIC ACID FUNCTIONAL POLYMER

|     |                              | Wt. (g) |
|-----|------------------------------|---------|
| a a | Amine terminated polyether (Example 7) | 659 |
| a b | Methoxy propoxy propanol     | 400     |
| a c | Paxwax 6364LA                | 20      |
| b b | Acrylic acid                 | 169     |
| b c | Styrene                      | 242     |
| c c | Benzoyl peroxide             | 4       |
| c d | Toluene                      | 40      |
| d d | Tertiary butyl perbenzoate   | 2       |
| d e | Methoxy propoxy propanol     | 20      |
| e e | Tertiary butyl perbenzoate   | 2       |
| e f | Methoxy propoxy propanol     | 20      |

1. aa, ab and ac were mixed in a 2-liter flask fitted with a thermometer-temperature controller, a condenser, a stirrer and 2 dropping funnels. The mixture was heated to 100° C.

2. bb and bc were premixed, and cc and cd were premixed. The two premixes were separately added over 1 hour 15 mins. at 100° C. The temperature, then, was inceased to 120° C. and maintained at that temperature over 45 mins.

3. dd and de were premixed and added. The reaction was maintained for 1 hour 15 mins. during which time the exotherm was allowed to take the temperature to 150° C.

4. ee and ef were premixed and added into the flask. The reaction was maintained at 120° C. for 1 hour 15 mins. 140 g of organic solvent was distilled to eliminate residual monomer.

The reaction product was dispersed in water in the same way as for Example 8.

The resulting coating composition had a viscosity of 40 sec. Ford Cup No. 4 at 25° C. at 29.4% solids.

The following four Examples demonstrate the use of hydroxy functional tertiary amines other than DMEA.

EXAMPLE 10

PREPARATION OF COATING COMPOSITION BASED ON AMINE TERMINATED POLYETHER USING N,N-DIETHYLETHANOLAMINE (DEEA)

|     |                              | Wt. (g) |
|-----|------------------------------|---------|
| a a | DER343                       | 213     |
| a b | Bisphenol A                  | 182     |
| a c | Butyl cellosolve             | 111     |
| b b | DEEA                         | 27.6    |
| b c | Butyl cellosolve             | 27.6    |
| c c | Carboxylic acid functional polymer (Example 5) | 468 |
| d d | Water                        | 777     |

1. aa, ab and ac were mixed in a 2-liter flask fitted with a thermometer-temperature controller, a condenser, a stirrer and heated to 170° C., at which temperature the heating was turned off. The exotherm was allowed to take the temperature to 195° C. The temperature was allowed to drop to 170° C. and reaction then cooled to 130° C.

2. bb and bc were premixed and added. Reaction was held at 105° C. over 1 hour, after which 51 g of organic solvent was distilled off to remove the residual DEEA.

3. cc was then added and mixed in well over 30 mins. at 70° C.

4. dd was then slowly added while maintaining constant stirring.

The resulting coating composition exhibited excellent stability and had a viscosity of 31 sec. Ford Cup No. 4 at 42% solids at 25° C.

EXAMPLE 11

PREPARATION OF AMINE TERMINATED POLYETHER USING 2-DIMETHYLAMINO-2-METHYLOL PROPANOL (DMAMP)

The method of preparation was the same as for EXAMPLE 10 except that ingredient bb was DMAMP.

The resulting coating composition had excellent stability and a viscosity of 23 sec. Ford Cup No. 4 at 37% solids and 25° C.

EXAMPLE 12

PREPARATION OF AMINE TERMINATED POLYETHER USING DIMETHYL ISOPROPANOLAMINE (DMPA)

The method of preparation was the same as for EXAMPLE 10 except that ingredient bb was DMPA.

The resulting coating composition had excellent stability and a viscosity of 24 sec. Ford No. 4 Cup at 34% solids at 25° C.

EXAMPLE 13

AQUEOUS DISPERSION BASED ON TRIETHANOLAMINE TERMINATED POLYETHER

The method of preparation was the same as for EXAMPLE 10 except that ingredient bb was triethanolamine.

The resulting coating composition had excellent stability and a viscosity of 32 sec. Ford No. 4 Cup at 34.8% solids at 25° C.

The following Examples demonstrate that modified epoxy resins with a wide range of epoxy equivalent weights, can be successfully amine terminated and dispersed in water using the invention herein disclosed.

EXAMPLES 14 TO 20

PART 1: MODIFICATION OF THE EPOXY RESIN

In each of these Examples, the appropriate mole ratio (see TABLE 1) of Bisphenol A and DER343, to a total weight of 803 g, were mixed with 162 g of butyl cellosolve, in a 2-liter flange-topped, round-bottomed flask, fitted with a condenser, a stirrer and a temperature probe which was connected to a temperature controller. The components were mixed continuously while heating to 170° C. over 1 hour, after which the heating was turned off and the exotherm allowed to take the temperature to reflux (195°–200° C.). The reaction was allowed to cool to 100° C. and samples were taken for epoxy equivalent weight determination.

PART 2: AMINE TERMINATION

After the samples were taken a mixture of DMEA and butyl cellosolve was added to the vessel and the temperature maintained at 100° C. for 1 hour. The mixtures used were as follows:

|  | DMEA (g) | Butyl Cellosolve (g) |
| --- | --- | --- |
| EXAMPLE 10 | 190 | 98 |
| EXAMPLE 11 | 190 | 49 |
| EXAMPLE 12 | 98 | 98 |
| EXAMPLES 14 TO 19 | 49 | 49 |

The reaction mixture was then distilled for 1 hour under a stream of nitrogen to remove excess DMEA.

PART 3: DISPERSION 200 g of the product of Part 2 was in each case mixed thoroughly with 178 g of carboxylic acid functional polymer for 1 hour at a temperature of 70° C. Then in each case water, 450 g, was stirred into the reaction mixture and a uniform dispersion obtained.

TABLE 1

RESULTS ON EXAMPLES 10 TO 12 AND 14 TO 19

| EXAMPLE NO. | 10 | 11 | 12 | 14 | 15 | 16 | 17 | 18 | 19 |
| --- | --- | --- | --- | --- | --- | --- | --- | --- | --- |
| Moles of Bisphenol A for each mole of DER343 | 0.5 | 0.67 | 0.82 | 0.93 | 1 | 1.08 | 1.22 | 1.5 | 2.0 |
| Epoxy equivalent wt. of modified epoxy resin | 500 | 880 | 1900 | 3000 | 4000 | 6000 | 8000 | 10000 | 28000 |
| Calculated molecular wt. of modified epoxy resin | 1000 | 1600 | 3000 | 5000 | 4000 | 3500 | 2000 | 1400 | 1000 |
| Viscosity of final aqueous dispersion sec. Ford Cup No. 4 at 25° C. | >300 | 88 | 119 | 26 | 15 | 20 | 19 | 18 | 18 |
| Measured solids | 32.9 | 32.8 | 32.3 | 32.9 | 33.1 | 34.1 | 34.3 | 34.3 | 33.5 |

EXAMPLE 20

PREPARATION OF AMINE TERMINATED POLYETHER FROM MODIFIED EPOXY RESIN HAVING VERY HIGH EPOXIDE EQUIVALENT WEIGHT

|  |  | Wt. (g) |
| --- | --- | --- |
| a a | DER343 | 1500 |
| a b | Bisphenol A | 1289 |
| a c | Butyl cellosolve | 782 |
| b b | DMEA | 148 |
| b c | Butyl cellosolve | 148 |
| c c | Carboxylic acid functional polymer (Example 5) | 3390 |
| d d | Water | 6704 |

1. aa, ab and ac were mixed in a flask fitted with a condenser, a thermometer-temperature controller, and a stirrer. The mixture was heated to 170° C., and the heating turned off. The exotherm was allowed to taken the temperature up to 190° C. (reflux temp.), after which the reaction was kept at reflux temperature for 5 hours. After this time the modified epoxy resin was found to have epoxy equivalent weight of 65000. The mixture was then cooled to 130° C.

2. bb and bc were premixed then added into the flask; reaction was maintained at 105° C. over 1 hour, after which 148 g of organic solvent was distilled off.

3. cc was then added and mixed in well. The above resin blend was dispersed into water by adding dd slowly with constant stirring. The viscosity of the paint was 126 sec. Ford Cup No. 4 at 37% solids at 25° C.

EXAMPLE 21

DISPERSION OF TITANIUM DIOXIDE INTO COATING

|  |  | Wt. |
| --- | --- | --- |
| a a | Coating composition of Example 10 | 1026 |
| a b | Titanium Dioxide | 214 |
| b b | Butanol | 20 |
| c c | Water | 20 |

1. aa and ab were ground for 30 minutes in a speed mill and a grind of less than 6 microns obtained.

2. bb was added to eliminate foam and cc to adjust viscosity.

The pigmented coating composition had good stability and a viscosity of 28 sec. Ford No. 4 Cup at 50% solids and 25° C.

EXAMPLE 22

DISPERSION OF A POLYMER BLEND CONTAINING A HIGH LEVEL OF AMINE TERMINATED POLYETHER

|  |  | Wt. (g) |
| --- | --- | --- |
| a a | Amine terminated polyether (Example 7) | 213.2 |
| b b | Carboxylic acid functional polymer | 9.20 |
| c c | DMEA | 0.88 |
| d d | Water | 154 |

1. The carboxylic acid functional polymer used was prepared as follows. 840 g acrylic acid, 767 g styrene, 11 g benzoyl peroxide and 3055 g butyl cellosolve were added to a 5-liter five-necked, flange-topped, round-bottomed flask fitted with a condenser, a stirrer and a thermometer, stirred until ac had dissolved, and heated to 80° C. The heating was then turned off, the exotherm was allowed to take the temperature to reflux after which the temperature started to drop. When the temperature had dropped to 130° C., the heating was turned on and 273 g solvent distilled off. The resulting polyelectrolyte had an NVM of 35%. When a sample was diluted with an equal weight of butyl cellosolve, it had a Gardner-Holdt viscosity of W at 25° C.

2. aa and bb were mixed well in a 750 ml flask at 70° C.

3. cc was added with constant stirring.

4. dd was added over 30 mins.

The dispersion was stable and had a viscosity of 180 sec. Ford Cup No. 4 at 25° C. at 46% solids.

What we claim is:

1. An aqueous dispersion of a tertiary amine terminated polyether and a carboxylic acid functional polymer wherein the tertiary amine terminated polyether is the product of the reaction of the epoxy group of an epoxy resin with the hydroxy group of a hydroxy functional tertiary amine and the carboxylic acid functional polymer is present in an amount sufficient to render the combination water dispersible.

2. An aqueous dispersion according to claim 1 in which the amine terminated polyether is formed from a Bisphenol A type epoxy resin.

3. An aqueous dispersion according to claim 2 in which the molecular weight of the Bisphenol A type epoxy resin is increased by further reaction with Bisphenol A.

4. An aqueous dispersion according to claim 1 in which the epoxy equivalent weight of the epoxy resin is greater than 5000.

5. An aqueous dispersion according to claim 1 in which the hydroxy functional tertiary amine is a mono hydroxy tertiary amine.

6. An aqueous dispersion according to claim 1 in which the hydroxy functional tertiary amine is N,N-dimethylethanolamine (DMEA).

7. An aqueous dispersion according to claim 1 in which the hydroxy functional tertiary amine is triethanolamine.

8. An aqueous dispersion according to claim 1 in which the carboxylic acid functional polymer is a polymer containing acrylic and/or methacrylic acid and/or crotonic acid.

9. An aqueous dispersion according to claim 1 in which the carboxylic acid functional polymer is a copolymer containing hydrophobic monomers such as styrene, butyl acrylate, ethyl acrylate, methyl methacrylate and butyl methacrylate.

10. An aqueous dispersion according to claim 1 in which the carboxylic acid functional polymer is a copolymer containing hydrophilic monomers such as hydroxy ethyl acrylate and hydroxy propyl methacrylate.

11. An aqueous dispersion according to claim 1 in which the carboxylic acid functional polymer contains acrylamide.

12. An aqueous dispersion according to claim 1 in which the carboxylic acid functional polymer is polymerised separately from the amine terminated polyether, and later mixed with said polyether.

13. An aqueous dispersion according to claim 1 in which the carboxylic acid functional polymer is polymerised in the presence of the amine terminated polyether.

14. A process for producing an aqueous dispersion of a tertiary amine terminated polyether and a carboxylic acid functional polymer which comprises:
(a) reacting the epoxide groups of an epoxy resin with a hydroxy functional tertiary amine to form a tertiary amine terminated polyether, and
(b) dispersing the tertiary amine terminated polyether in water with the aid of a carboxylic acid functional polymer in an amount sufficient to render the combination dispersible.

15. A process as claimed in claim 14, wherein the tertiary amine terminated polyether is formed under substantially anhydrous reaction conditions.

16. A process as claimed in claim 14, wherein the carboxylic acid functional polymer is dissolved in water prior to being used to disperse the tertiary amine terminated polyether.

17. A coating composition comprising the aqueous dispersion of claim 1.

18. A coating composition comprising a stable dispersion in water of:
(i) a tertiary amine terminated polyether which is in ionic association with
(ii) a polymer derived, at least in part, from carboxylic acid functional monomers, and
(iii) a crosslinking agent.

19. A coating composition as claimed in claim 18, formulated for use in the lining of metal containers for food and beverages.

* * * * *